(12) United States Patent
Carroll et al.

(10) Patent No.: US 9,664,857 B2
(45) Date of Patent: May 30, 2017

(54) NONRECIPROCAL COUPLER ISOLATOR

(71) Applicant: The United States of America, as represented by the Secretary of the Air Force, Washington, DC (US)

(72) Inventors: Turhan K Carroll, Dublin, OH (US); Miguel Levy, Chassell, MI (US); Ramy El-Ganainy, Hancock, MI (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/133,543

(22) Filed: Apr. 20, 2016

(65) Prior Publication Data

US 2016/0341981 A1    Nov. 24, 2016

Related U.S. Application Data

(60) Provisional application No. 62/162,849, filed on May 18, 2015.

(51) Int. Cl.
*G02F 1/095* (2006.01)
*G02B 6/27* (2006.01)
*G02B 6/12* (2006.01)

(52) U.S. Cl.
CPC ......... *G02B 6/2746* (2013.01); *G02F 1/0955* (2013.01); *G02B 2006/12157* (2013.01)

(58) Field of Classification Search
None
See application file for complete search history.

(56) References Cited

U.S. PATENT DOCUMENTS

| | | | |
|---|---|---|---|
| 3,569,868 A | 3/1971 | Suzuki et al. | |
| 3,646,486 A * | 2/1972 | Wen | H01P 1/36 333/21 R |
| 3,830,555 A | 8/1974 | Warner | |
| 4,047,801 A | 9/1977 | Challeton et al. | |
| 4,859,014 A | 8/1989 | Schmitt et al. | |
| 6,535,656 B1 | 3/2003 | Noge et al. | |
| 2009/0003769 A1 | 1/2009 | Fukai et al. | |

FOREIGN PATENT DOCUMENTS

EP    1227359 A2    7/2002

OTHER PUBLICATIONS

N. Bahlmann et al., "A Comparison of an Improved Design for Two Integrated Optical Isolators Based on Nonreciprocal Mach-Zehnder Interferometry," MRS Proceedings, 517, 513 doi:10.1557/PROC-517-513 (1998).
R. El-Ganainy et al., "On-Chip Multi 4-Port Optical Circulators," in IEEE Photonics Journal, vol. 6, No. 1, pp. 1-8, doi:10.1109/JPHOT.2013.2294693 (Feb. 2014).

* cited by examiner

*Primary Examiner* — Mike Stahl
(74) *Attorney, Agent, or Firm* — AFMCLO/JAZ; Charles Figer, Jr.

(57) ABSTRACT

A non-reciprocal coupler isolator is provided including a first waveguide. The first waveguide includes a magnetic cladding cover layer magnetized transversely to a propagation direction of the first waveguide. A second waveguide is positioned adjacent to the first waveguide and separated by a gap. The second waveguide includes a non-magnetic cladding cover layer with a refractive index that matches a refractive index of the magnetic cladding cover layer of the first waveguide.

10 Claims, 2 Drawing Sheets

ND RECIPROCAL COUPLER ISOLATOR

NONRECIPROCAL COUPLER ISOLATOR

CROSS-REFERENCE TO RELATED APPLICATIONS

This application claims the benefit of and priority to U.S. Provisional Application Ser. No. 62/162,849, entitled "Nonreciprocal Coupler Isolator," filed on May 18, 2015, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to isolators and, more particularly, to optical isolators.

Description of the Related Art

Isolators are important components for photonic systems and for protection of communications and sensor systems. Due to the strong push to develop high performance, low power photonic integrated circuits (PIC), there is a pressing need for footprint reduction and silicon integration in optical isolators. These desired isolator characteristics must also be combined with optimal isolation performance and propagation loss in order to provide necessary performance in PICs.

Contemporary chip scale optical isolator design is based on a Mach-Zehnder Interferometer (MZI) scheme. Typical MZI isolator designs range from 1.5 mm to 5 mm in length, and have an isolation ratio of between 20 dB and 30 dB. A particular MZI device has been shown to provide 20 dB isolation for a bandwidth of 8 nm with a peak isolation ratio close to 30 dB at 1.55 µm, and with a forward insertion loss (excluding coupling losses) of 13 dB.

An MZI isolator generally consists of four waveguides, one input port, one output port, and two waveguides which transport the light from the input to output ports. The last two waveguide elements are coupled to the input and output ports via integrated y-branches or multimode interference devices, which add to the total length, and overall footprint of the device. These beam splitters must be properly balanced to achieve a 50/50 split between the two arms of the interferometer. This can lead to coupling and bending losses associated with coupling light into the MZI and its transport from input to output. The device is also generally covered by a magnetic cladding layer which induces the nonreciprocal phase shift responsible for isolation.

Accordingly, there is a need in the art for an isolator with a simpler design, higher isolation performance, lower forward loss, and smaller footprint.

SUMMARY OF THE INVENTION

Embodiments of the invention address the needs in the art by providing a non-reciprocal coupler isolator including a first waveguide and a second waveguide. The first waveguide includes a magnetic cladding cover layer magnetized transversely to a propagation direction of the first waveguide. The second waveguide is adjacent to the first waveguide and separated by a gap. The second waveguide includes a non-magnetic cladding cover layer with a refractive index that matches a refractive index of the magnetic cladding cover layer of the first waveguide. The first and second waveguides are in silicon-on-insulator on a silicon base layer.

In a specific embodiment, the first and second waveguides have a ridge thickness of 300 nm. The first and second waveguides have a ridge width of 2 µm. The silicon base layer has a thickness of 280 nm. A center-to-center spacing between the ridges of the first and second waveguides is 3.66 µm.

In some embodiments, the magnetic cladding cover layer may consist of cerium substituted yttrium iron garnet (Ce:YIG). Additionally, the non-magnetic cladding cover layer may consist of rutile phase titanium dioxide ($TiO_2$).

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Isolators are important components in integrated photonics because they are used for protection of communications and sensor systems. Circulators have just as much importance as they can be used to direct light from some input channel to a different output channel, thus directing the flow of light by separating optical signals that travel in opposite directions. Due to a strong push to develop high performance, low power photonic integrated circuits (PIC), there is a pressing need for footprint reduction and silicon integration of optical isolators. These desired isolator characteristics must also be combined with optimal isolation performance and propagation loss in order to provide necessary performance in PICs.

Thus, embodiments of the invention address the need in the art by providing a chip-scale magneto-optic device design in a silicon based coupler with a single nonreciprocal arm and a suitably index-matched reciprocal second arm. The embodiments of the invention may be used as an optical isolator, or a circulator. This structure of the embodiments of the invention displays a simple design, high levels of optical isolation, low forward loss, and small footprint.

Figure 1:
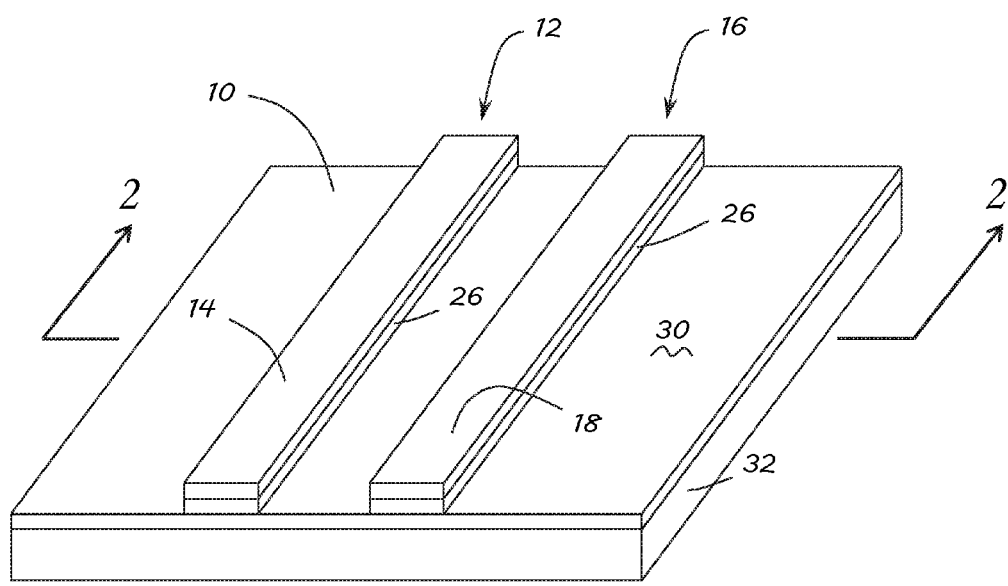
FIG. 1 is an isometric view of a design of a waveguide coupler isolator consistent with embodiments of the invention.
Figure 2:
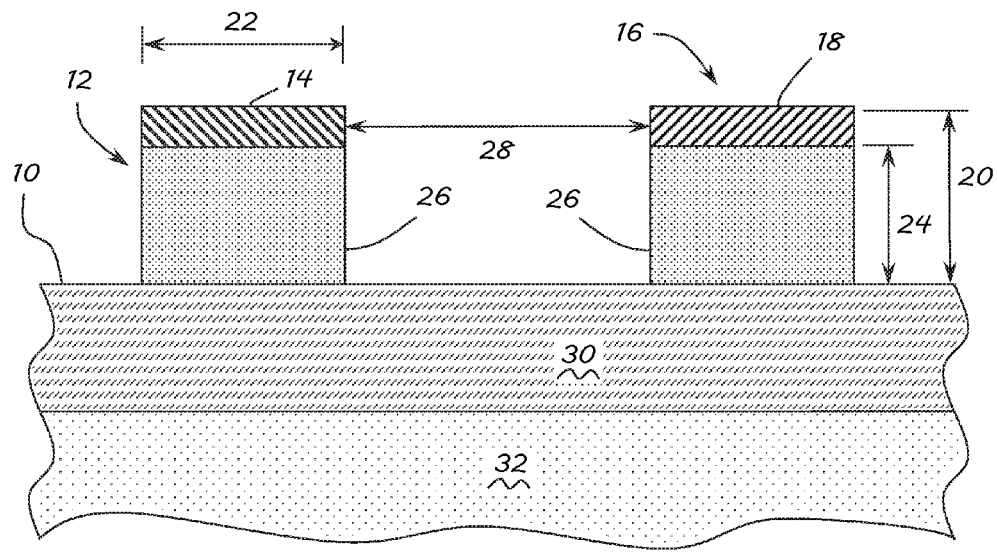
FIG. 2 is a cross sectional view of the waveguide coupler isolator of FIG. 1.

FIGS. 1 and 2 provide a schematic representation of an exemplary embodiment of the invention, which consists of a single waveguide coupler 10. A first waveguide 12 includes a magnetic cladding cover layer 14, magnetized transversely to a propagation direction. A second waveguide 16 is adjacent to the first waveguide 12 and covered with a nonmagnetic material 18 that matches in refractive index of the magnetic material 14 on the first waveguide 12. This configuration leads to a much more simple design, with fewer avenues for loss during the process of transporting light. In this illustrated embodiment, the waveguides 12, 16 were formed from silicon-on-insulator with each waveguide 12, 16 having a ridge thickness 20 of 300 nm and a ridge width 22 of 2 µm. A thickness 24 of a silicon base layer 26 is 280 nm and a center-to-center spacing between the two ridges is 3.66 µm forming gap 28. The insulating layer 30 is composed of silicon dioxide and has a thickness of 3 µm for this embodiment. The insulating layer 30 is positioned on a handling layer 32, composed of silicon having a thickness of about 1 mm. The thicknesses, widths, and spacings set out above for the exemplary embodiment are selected for a bandwidth of about 60 nm. These dimensions may be greater or smaller for other embodiments of the invention based on bandwidth requirements.

Figure 3:
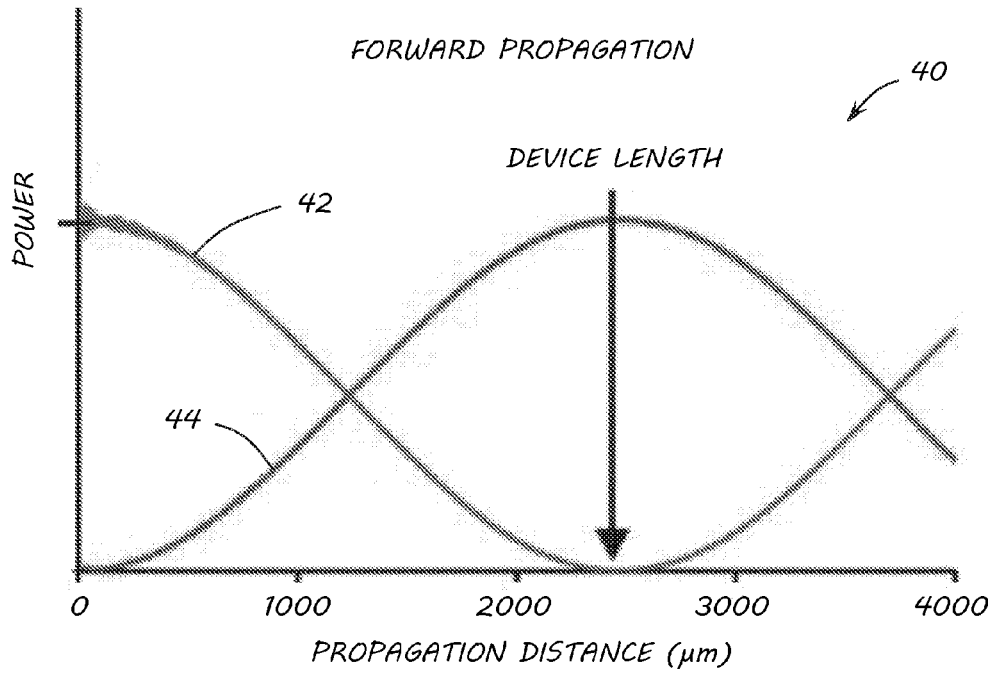
FIG. 3 is a graph of power transfer between coupler arms for forward propagation.
Figure 4:
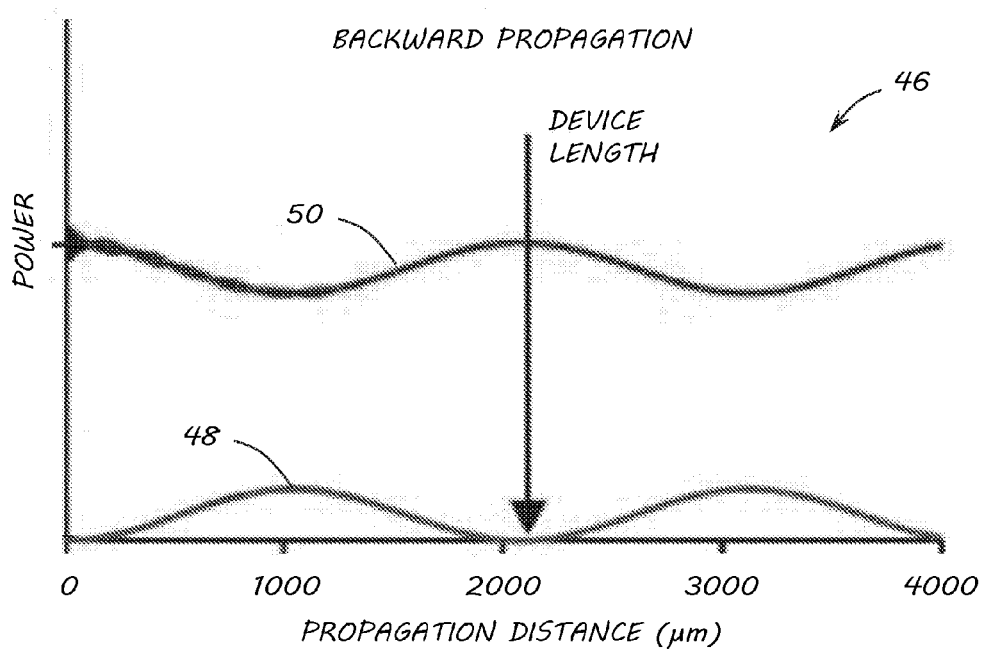
FIG. 4 is a graph of power transfer between coupler arms for backward propagation.

FIGS. 3 and 4 show the transmission of light and power transfer between waveguides 12, 16 in the exemplary embodiment for the forward and backward transport obtained via semi-vectorial beam-propagation simulation. For the sake of simulation of performance, and for the exemplary embodiment, the magneto-optic material 14 of waveguide 12 was cerium substituted yttrium iron garnet (Ce:YIG) and the non-magnetic material 18 of waveguide 16 was rutile phase titanium dioxide ($TiO_2$) since it has the same refractive index as Ce:YIG. Other embodiments may use other materials as long as the refractive indices of those materials match. In the forward direction, light is input into waveguide 12. The two waveguides 12, 16 share a common propagation constant and due to co-directional coupling, there is a complete power transfer from waveguide 12 to waveguide 16. The light that is coupled into waveguide 12 is fully transferred to waveguide 16. This occurs at a length of 2.47 mm for the exemplary embodiment. This is illustrated graph 40 in FIG. 3. Curve 42 represents the power from the light coupled to waveguide 12 and curve 44 represents the power transferred to waveguide 16.

In the backward direction, this situation is quite different due to the magneto-optic nonreciprocity of the system. The returning signal enters waveguide 16, and there is now a difference between the propagation constants in waveguide 12 and waveguide 16 due to the nonreciprocal phase-shift effect. As a result, very little power is transfer into the input port in waveguide 12. This is illustrated in graph 46 in FIG. 4. Curve 48 represents the power from the light transferred to waveguide 16 and curve 50 represents the power transferred to the waveguide 12.

Simulations show that the performance of this structure is quite favorable when compared with other chip scale optical isolator designs. An isolation ratio of 43 dB was calculated with 4 dB of forward propagation loss due to mismatch between forward and backward coupling lengths. This mismatch loss can be significantly reduced in other embodiments by proper adjustment of an interwaveguide coupling constant. Absorption losses into the garnet material are estimated at 2.5 dB. The isolation ratio stays above 30 dB over a 60 nm bandwidth. The high isolation ratio is due to that fact that a nonreciprocal action has been engineered into one of the waveguide ridges via a magneto-optic cladding layer, while the other ridge is cladded with a reciprocal material which has a matching refractive index. This leads to complete transfer of power between the two ridges in one direction and almost zero power transfer in the opposite direction. Thinner silicon films yield smaller footprints, estimated at less than 1 mm in length.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A non-reciprocal coupler isolator, comprising:
a first waveguide, the first waveguide including a magnetic cladding cover layer magnetized transversely to a propagation direction of the first waveguide; and
a second waveguide adjacent to the first waveguide and separated by a gap, the second waveguide including a non-magnetic cladding cover layer with a refractive index that matches a refractive index of the magnetic cladding cover layer of the first waveguide.

2. The non-reciprocal coupler isolator of claim 1, where the cladding of the first and second waveguides is positioned on a corresponding base layer positioned on an insulating layer.

3. The non-reciprocal coupler isolator of claim 2, wherein the corresponding base layers comprise silicon.

4. The non-reciprocal coupler isolator of claim 2, wherein the insulating layer comprises silicon dioxide.

5. The non-reciprocal coupler isolator of claim 2, wherein the corresponding base layers have a thickness of 280 nm.

6. The non-reciprocal coupler isolator of claim 1, wherein the first and second waveguides have a ridge thickness of 300 nm.

7. The non-reciprocal coupler isolator of claim 1, wherein the first and second waveguides have a ridge width of 2 µm.

8. The non-reciprocal coupler isolator of claim 1, wherein a center-to-center spacing between the first and second waveguides is 3.66 µm.

9. The non-reciprocal coupler isolator of claim 1, wherein the magnetic cladding cover layer comprises cerium substituted yttrium iron garnet (Ce:YIG).

10. The non-reciprocal coupler isolator of claim 1, wherein the non-magnetic cladding cover layer comprises rutile phase titanium dioxide ($TiO_2$).

* * * * *